United States Patent Office 3,218,125
Patented Nov. 16, 1965

3,218,125
PROCESS OF PRODUCING HYDROGEN FLUORIDE FROM FLUOSILICIC ACID IN A TWO-STAGE PROCEDURE
Theodore T. Houston, Tampa, and Gerald E. G. Wilkinson, Temple Terrace, Fla., assignors, by mesne assignments, to Tennessee Corporation, New York, N.Y., a corporation of Delaware
Filed Sept. 10, 1962, Ser. No. 222,527
9 Claims. (Cl. 23—153)

The present application is related to co-pending applications of Llewellyn C. Oakley, Jr. and Theodore T. Houston (Serial No. 222,526), of Gerald E. G. Wilkinson (Serial No. 222,447), of Theodore T. Houston (Serial No. 222,442), and of Fred J. Klem (Serial No. 222,424), all of which have been assigned to a common assignee.

The present invention relates to the process of producing hydrogen fluoride from fluosilicic acid in a two-stage procedure and effecting evolution of gas and/or vapor containing the major portion of hydrogen fluoride in the second stage by the addition of hot concentrated sulfuric acid.

It is an object of the present invention to provide an improved process of producing hydrogen fluoride from fluosilicic acid involving a two-stage procedure to effect the evolution of gas and/or vapor containing the major portion of hydrogen fluoride in the second stage by the addition of hot concentrated sulfuric acid.

Another object of the invention is to provide an improved process of producing hydrogen fluoride involving the dehydration and decomposition of fluosilicic acid with strong sulfuric acid under conditions of concentration of sulfuric acid, temperature and retention time so that substantially all of the silicon tetrafluoride present is evolved in the first stage as a substantially dry gas and is reabsorbed in water to produce more fluosilicic acid while the hydrogen fluoride is retained in a weaker sulfuric acid solution and is liberated in the second stage.

It is a further object of the invention to provide an improved process of producing hydrogen fluoride from fluosilicic acid involving a two-stage procedure to retain the bulk or substantially all of the hydrogen fluoride produced in the first stage in weak sulfuric acid and to liberate substantially all of the hydrogen fluoride in the second stage by using considerable retention time and a larger reactor.

The invention further contemplates providing an improved process of producing hydrogen fluoride from fluosilicic acid with practical equipment and operations on an industrial scale.

Figure 1:
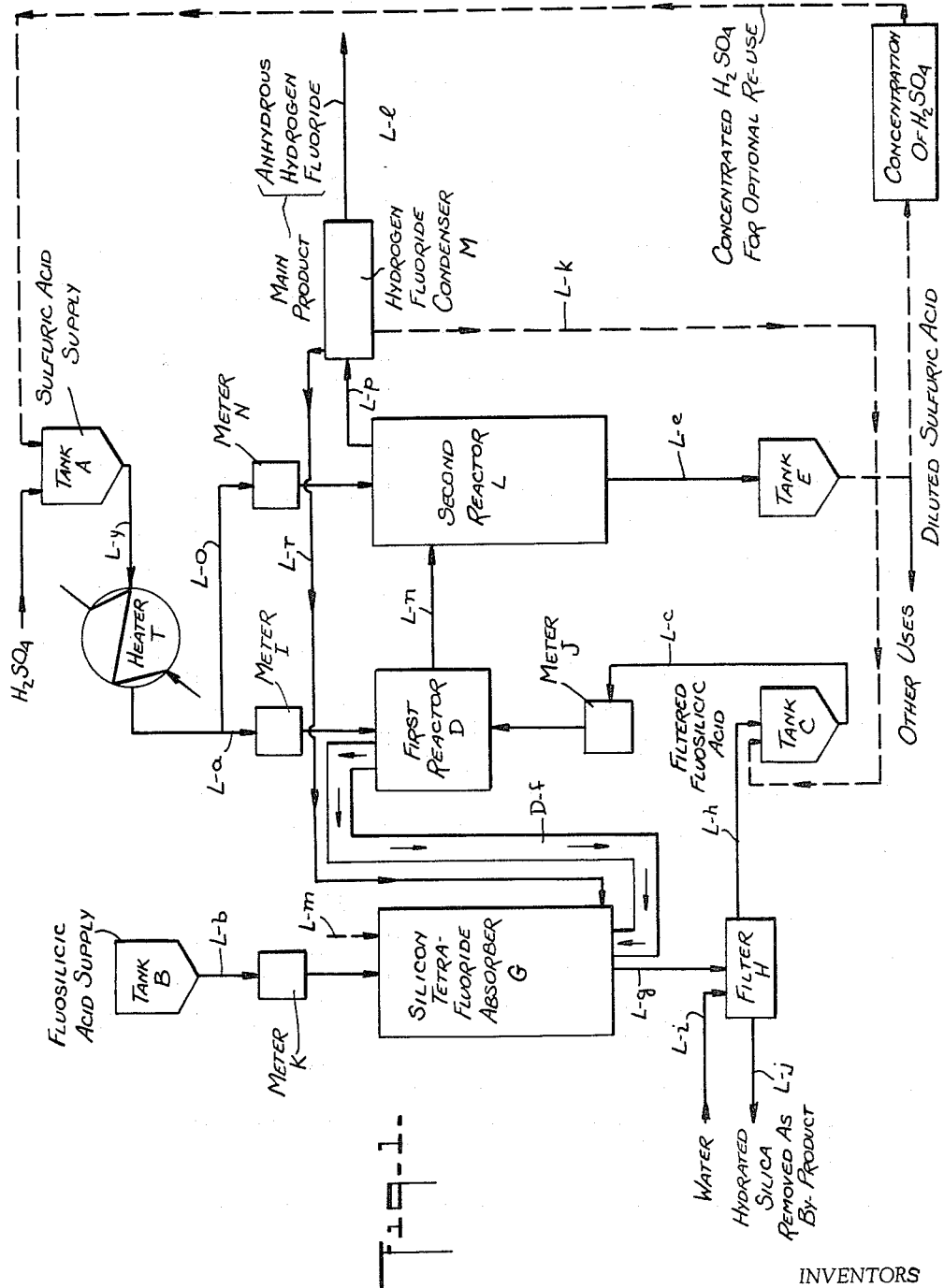
Figure 2:
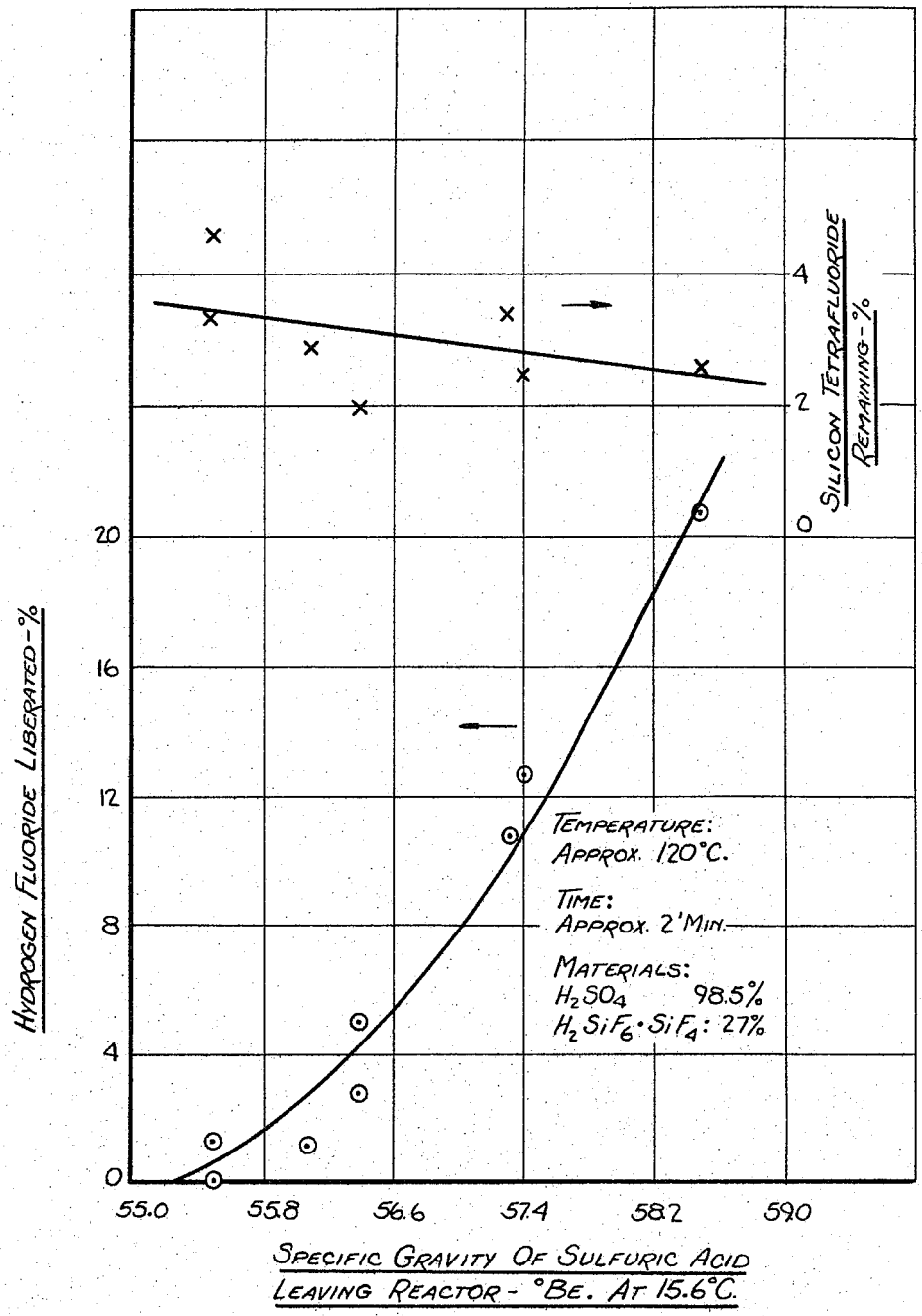
Figure 3:
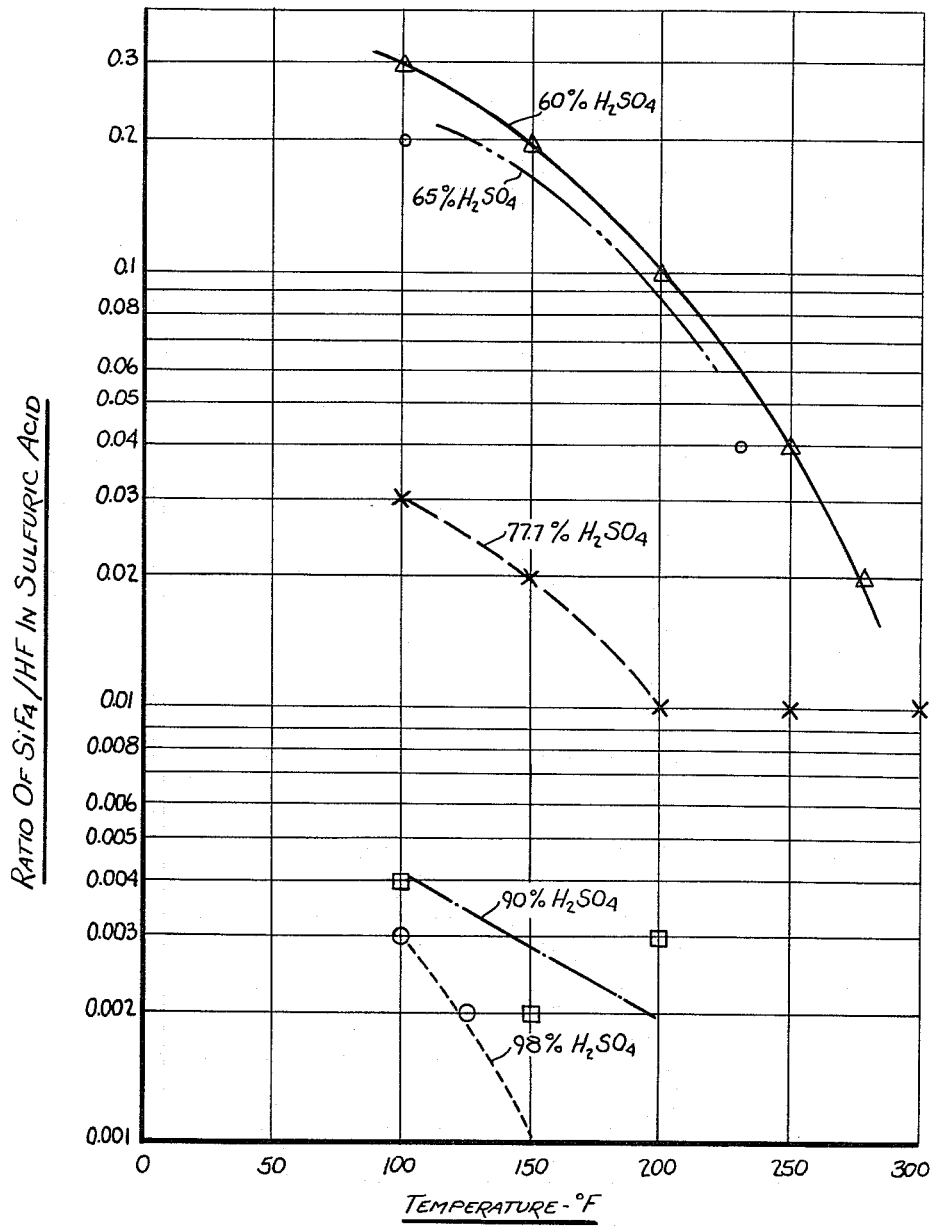

Other objects and advantages will become apparent from the following description taken in conjunction with the accompanying drawings, in which:

FIG. 1 is a flow sheet illustrating the operations and equipment diagrammatically to carry the improved process into practice;

FIG. 2 depicts curves, one of which shows the relation of the hydrogen fluoride liberated as a gas expressed as percent of the total hydrogen fluoride formed by dehydration of the fluosilicic acid versus the specific gravity of sulfuric acid leaving the reactor expressed as degrees Baumé corrected to 15.6° C. (60° F.); and the other of which shows the relation of the silicon tetrafluoride retained in solution expressed as percent of the total silicon tetrafluoride formed by the dehydration of the fluosilicic acid versus the specific gravity of the sulfuric acid leaving the reactor expressed as degrees Baumé corrected to 15.6° C. (60° F.); and FIG. 3 depicts curves showing the ratio of HF to $SiF_4$ which will dissolve in several strengths or concentrations of sulfuric acid at various temperatures.

Generally speaking, the present invention contemplates a process in which clear fluosilicic acid is treated in the first reactor with definite control of concentration of the sulfuric acid, temperature, and retention time so that essentially all of the silicon tetrafluoride present is evolved while the major portion of the hydrogen fluoride remains in the acid leaving the reactor. It has been discovered that when fluosilicic acid and sulfuric acid are mixed and the hydrogen fluoride and silicon tetrafluoride released as substantially dry gases, the release of the hydrogen fluoride is much less rapid than is the release of the silicon tetrafluoride. The mechanism involved in the phenomenon is not fully understood, but this in no way detracts from its practical application.

In order to obtain a better understanding of the discovery that silicon tetrafluoride was immediately evolved and hydrogen fluoride much more slowly evolved when fluosilicic acid and concentrated sulfuric acid were mixed at elevated temperatures, the following series of tests were performed.

Silicon tetrafluoride and hydrogen fluoride gases were metered in portions corresponding to the products of dehydration of $H_2SiF_6 \cdot SiF_4$ (i.e. equal molar quantities) and were passed through a mixing vessel, then through a copper coil preheater and finally bubbled into sulfuric acid ($H_2SO_4$) in a cylinder made of Teflon. The cylinder was kept at a constant temperature until saturated with the gases. The test was performed with five concentrations of sulfuric acid and at various temperatures between 100° F. (38° C.) and 300° F. (149° C.). The ratio of $SiF_4$/HF solubilities in various strengths of sulfuric acid is graphically presented in FIG. 3.

Data from the tests are set forth in the following Table I.

TABLE I

| $H_2SO_4$, percent | Temperature, °F. | HF, percent | $SiF_4$, percent | Ratio, $SiF_4$/HF |
|---|---|---|---|---|
| 98 | 100 | 27.3 | 0.07 | 0.003 |
|  | 125 | 22.0 | 0.04 | 0.002 |
|  | 150 | 14.4 | 0.004 | 0.0003 |
|  | 175 | 6.52 | <0.001 | <0.0002 |
|  | 200 | 3.60 | 0.001 | 0.0003 |
|  | 225 | 3.96 | <0.001 | <0.0003 |
|  | 250 | 1.81 | 0.001 | 0.0006 |
|  | 275 | 1.06 | <0.001 | <0.001 |
|  | 300 | 0.48 | <0.001 | <0.001 |
| 90 | 100 | 30.4 | 0.13 | 0.004 |
|  | 150 | 12.0 | 0.03 | 0.002 |
|  | 200 | 3.2 | 0.01 | 0.003 |
|  | 250 | 1.39 | <0.005 | <0.004 |
|  | 300 | 0.76 | <0.005 | <0.007 |
| 77.7 | 100 | 35.1 | 1.1 | 0.03 |
|  | 150 | 11.8 | 0.20 | 0.02 |
|  | 200 | 4.74 | 0.06 | 0.01 |
|  | 250 | 1.60 | 0.02 | 0.01 |
|  | 300 | 0.74 | 0.01 | 0.01 |
| 65 | 100 | 21.6 | 7.3 | 0.3 |
|  | 150 | 18.3 | 3.2 | 0.2 |
|  | 200 | 7.85 | 0.5 | 0.1 |
|  | 250 | 5.00 | 0.2 | 0.04 |
|  | 277 | 2.29 | 0.05 | 0.02 |
| 60 | 100 | 43.1 | 7.11 | 0.2 |
|  | 150 | 23.4 | 5.12 | 0.2 |
|  | 200 | 11.6 | 1.67 | 0.1 |
|  | 230 | 5.23 | 0.2 | 0.04 |

It is to be noted that the ratio of $SiF_4$ to HF in the "gas stream" introduced into the $H_2SO_4$ is equal to 1.0.

While equilibrium, of course, is not attained in carrying the invention into practice, the equilibrium data aid one skilled in the art to understand the nature of the discovery. It is shown by FIG. 3 that the ratio of $SiF_4$ to HF dissolved in sulfuric acid at equilibrium varies inversely with temperature and sulfuric acid concentration. Above about 65% $H_2SO_4$, the effect of sulfuric acid concentration is more pronounced than is the effect of temperature.

With sulfuric acid concentrations above 77.7%, the ratio of $SiF_4$ to HF dissolved in the sulfuric acid is sufficiently low at temperatures as mild as 100° F. (38° C.) that when these gases are subsequently liberated from the acid, simple rectification will yield a hydrogen fluoride of satisfactory commercial purity. At sulfuric acid concentrations in the range of 60–65% $H_2SO_4$, an equilibrium temperature in the range of 200° F. (93° C.) would be required in carrying the invention into practice.

A second series of tests were performed to obtain the data presented in FIG. 2. These data will make clear the application of the discovery to one skilled in the art. Concentrated sulfuric acid of about 98.5% $H_2SO_4$ and filtered fluosilicic acid of about 27% $H_2SiF_6 \cdot SiF_4$ were added to a stirred reaction vessel maintained at 120° C. (248° F.) in varying proportions so as to result in terminal specific gravities [corrected to 15.6° C. (60° F.)] between 55° Bé. and 60° Bé. After approximately two minutes, samples were removed and analyzed for fluorine and silica. From the analytical data obtained, the percent of the hydrogen fluoride liberated and the percent of the silicon tetrafluoride remaining were calculated. The data obtained in this series of tests are presented graphically in FIG. 2. The left ordinate which applies to the lower curve, is the hydrogen fluoride liberated expressed as percent of the total hydrogen fluoride formed by dehydration of the fluosilicic acid. The right ordinate, applying to the upper curve, is the silicon tetrafluoride remaining expressed as percent of the total silicon tetrafluoride formed by dehydration of the fluosilicic acid. Abscissa is the specific gravity of the sulfuric acid solution leaving the reactor expressed as ° Bé. corrected to 15.6° C. (60° F.).

It may be seen by inspection of the resulting curves that under the conditions of retention time and temperature at which the series of tests were performed, i.e., two minutes at 120° C. (248° F.), essentially none of the hydrogen fluoride and above about ninety-six percent of the silicon tetrafluoride were liberated when the specific gravity of the residual solution was below about 55.5° Bé. (corresponding to about 70.4% $H_2SO_4$). Under the same conditions when the terminal specific gravity was about 58.5° Bé. (corresponding to about 75.2% $H_2SO_4$) in excess of 20% of the hydrogen fluoride was liberated with the residual silicon tetrafluoride being about 2.5%. It is thus apparent that a slight change in the terminal sulfur acid concentration (in the above case from about 70% to about 75% $H_2SO_4$) results in a substantial change in the quantity of hydrogen fluoride liberated in a given time, yet only a minor change in the quantity of silicon tetrafluoride remaining. Of course, as is obvious to one skilled in the art, the concentrations apply only to the retention time and temperature cited. With a longer retention time at the same temperature, the same results would be effected at a lower sulfuric acid concentration, or with a shorter retention time and the same temperature at a higher concentration; similarly with the same retention time and a higher temperature a lower sulfuric acid concentration would produce the same results. For each temperature and retention time there will be a concentration of sulfuric acid which will result in essentially all of the silicon tetrafluoride liberated and essentially all of the hydrogen fluoride retained.

Practical considerations, however, somewhat limit the range of concentrations to be used. At lower concentrations, say below about 50° Bé., either temperatures must be higher causing unnecessary corrosion problems or retention time must be long causing larger and more expensive equipment. At higher concentrations above say about 63° Bé., either the retention time must be kept so low that control becomes a problem, or temperatures must be so low that it becomes necessary to heat the highly corrosive solution of hydrogen fluoride in sulfuric acid in order to have a sufficiently high temperature in the second reactor.

We have found the range of 55° Bé. to 60° Bé. (about 69% $H_2SO_4$ to about 78% $H_2SO_4$) to be the most satisfactory, but the invention is in no way limited to such a range. Silicon tetrafluoride gas is absorbed by water or by the water in the supply fluosilicic acid to build up a stronger fluosilicic acid and produce a hydrated silica which is removed by filtration as a by-product. While any strength sulfuric acid and/or fluosilicic acid can be used, provided they can be mixed in such proportions to yield the desired concentrations in the first and second reactors, certain practical considerations limit the concentrations when the invention is reduced to practice. In the case where the sulfuric acid is to be concentrated for re-use in the process, a minimum quantity should be used to keep down concentration cost. In the case where the sulfuric acid used in the process is to be used in the production of superphosphate or wet process phosphoric acid, the quantity used must not exceed the quantity consumed in the acidulation of phosphate rock to produce the quantity of fluosilicic acid to be treated. For example, when one ton of normal superphosphate is produced approximately 0.36 ton of 100% sulfuric acid are required and from about 15 to 25 pounds of fluosilicic acid (100% basis) are recovered. The strength of the filtered fluosilicic acid leaving the absorption tower after filtration would have to be sufficiently concentrated that all of it could be reacted with the available sulfuric acid. This will be further clarified in the examples which follow. Hydrated silica is filtered off, is washed with water, and is removed as a by-product. The fluosilicic acid thus produced is clear and free from silica and is sent back to the first reactor. Hot sulfuric acid containing most of the hydrogen fluoride goes immediately to the second reactor where more concentrated sulfuric acid is added which brings up the temperature and the concentration. Hydrogen fluoride is released from the sulfuric acid and is condensed in a hydrogen fluoride condenser.

Three inter-related variables determine the conditions in the second reactor. They are:

(1) The temperature of the sulfuric acid solution of hydrogen fluoride.
(2) The terminal concentration of the sulfuric acid solution.
(3) Retention time.

The temperature has as its upper limit the boiling point of the particular strength of sulfuric acid utilized. There is no theoretical lower limit; however, practical considerations fix the lower limit in the range of about 90° C. (194° F.). At temperatures much below this the release of hydrogen fluoride becomes slow, requiring excessive retention time and large equipment for substantially complete release of the hydrogen fluoride.

The terminal sulfuric concentration has an upper limit of about 100% $H_2SO_4$ and no well defined lower limit. Practically speaking, however, below a concentration of about 65% $H_2SO_4$ release of hydrogen fluoride is excessively slow.

As is well known to one skilled in the art, retention time is a function of other conditions imposed upon the reaction. Under conditions of high temperature and sulfuric acid concentration, retention time in the order of minutes is sufficient for substantially complete release of the hydrogen fluoride. On the other hand, at low temperatures and sulfuric acid concentrations, several hours are required.

In carrying the invention into practice, it is preferred to use the operation and the equipment illustrated in FIG. 1.

A supply of concentrated sulfuric acid, such as commercially available of about 66° Bé. acid as produced by the contact process is provided by tank A, and a supply of clear or filtered aqueous fluosilicic acid is provided by tank C. The sulfuric acid flows from tank A through line L–y to heater T which heats it to a selected and controlled temperature. After heating, the hot acid flows through the line L–a to meter I which controls the proper amount going to reactor D. Materials of construction to this point can be those conventionally used in the art to handle the strength of sulfuric acid employed as those skilled in the art understand. The clear or filtered fluosilicic acid is fed to reactor D and flows through line L–c and meter J, which are rubber-lined or plastic, controlling the amount.

In reactor D, such as a graphite or fluorocarbon lined vessel, aqueous fluosilicic acid is dehydrated by concentrated sulfuric acid. The retention time, temperature, and terminal concentration of the liquid leaving the reactor are controlled so that substantially all of the silicon tetrafluoride and a small portion of the hydrogen fluoride are liberated as gases while the major portion of the hydrogen fluoride remains in the sulfuric acid. Silicon tetrafluoride gases leave reactor D via duct D–f to a plastic or rubber-lined absorbed G for silicon tetrafluoride.

Fresh aqueous fluosilicic acid flows from tank B through meter K via line L–b to absorber G. To prevent small losses or minimize the escapage of fumes to the atmosphere, additional water may be optionally added to absorber G via line L–m. In the absorber, silicon tetrafluoride reacts with water to form fluosilicic acid and a precipitate of silica. The slurry of silica and fluosilicic acid flows via line L–g to rubber covered filter H where the silica precipitate is removed by filtration and is washed with water supplied by line L–i. The clear or filtered fluosilicic acid flows via line L–h and is recycled in the process to plastic or rubber lined tank C. The silica precipitate is removed as a by-product via conveyor L–j for other uses or for further processing.

The sulfuric acid stream flows from reactor D via line L–n to graphite or fluorocarbon line reactor L. Additional hot concentrated sulfuric acid is added to line L–o through meter N from sulfuric acid supply tank A. In reactor L hydrogen fluoride is stripped from the sulfuric acid. The sulfuric acid, now diluted with the water in the fluosilicic acid, leaves through line L–e to tank E. From tank E, it can be concentrated for re-use in this process or it can be utilized in other processes. The substantially dry hydrogen fluoride leaves reactor L via line L–p to a hydrogen fluoride condenser M. Anhydrous hydrogen fluoride leaves via line L–l to storage or utilization.

When operating conditions are selected, a small quantity of aqueous hydrogen fluoride normally will be condensed in the inlet portion of the condenser due to the slight carry-over of water. The solution coming from the hydrogen fluoride condenser M may be recycled via line L–k to the aqueous fluosilicic acid supply tank C. In addition, a small quantity of silicon tetrafluoride present as an impurity will not condense and is separated and returned to the absorber G via line L–r.

For the purpose of giving those skilled in the art a better understanding of the invention and/or a better appreciation of the advantages of the invention, the following illustrative examples are given:

Example I

Commercially concentrated (about 66° Bé.) sulfuric acid is provided by tank A and 25% filtered fluosilicic acid $H_2SiF_6$ by tank C. From tank A via line L–y to heater T flows about 4590 pounds of sulfuric acid. In heater T the acid is heated to about 120° C. (248° F.). After heating, the hot acid flows through line L–a to meter I which controls the amount going to reactor D to about 3220 pounds. The fluosilicic acid containing about 4 pounds of HF is also fed to reactor D and flows from tank C through line L–c and meter J controlling the amount to about 1640 pounds.

In reactor D, aqueous fluosilicic acid is dehydrated by concentrated sulfuric acid. The retention time is four minutes, the temperature about 125° C. (257° F.), and the terminal concentration of the liquid leaving the reactor about 69.6% $H_2SO_4$. Under these conditions, substantially all (294 pounds) of the silicon tetrafluoride and a small portion (10 pounds) of the hydrogen fluoride are liberated as gases while the major portion (108 pounds) of the hydrogen fluoride remains in the sulfuric acid. Silicon tetrafluoride gases leave reactor D via duct D–f to a silicon tetrafluoride absorber G. Fresh, aqueous fluosilicic acid (20% $H_2SiF_6$) flows from tank B in the amount of about 647 pounds through meter K via line L–b to absorber G; about 733 pounds of water are added to absorber G via line L–m.

In the silicon tetrafluoride absorber, silicon tetrafluoride reacts with water to form fluosilicic acid and a precipitate of silica. The slurry of silica and fluosilicic acid flows via line L–g to filter H where the silica precipitate is removed and washed with about 51 pounds of water supplied by line L–i. Filtered or clear fluosilicic acid (about 1635 pounds of 25% $H_2SiF_6$) flows via line L–h and is recycled in the process to tank C. The silica precipitate (about 51 pounds, dry basis) containing about 5 pounds $H_2SiF_6$ is removed via conveyor L–j for other uses or for further processing.

The sulfuric acid stream flows from reactor D via line L–n to reactor L. Additional hot concentrated sulfuric acid (about 1370 pounds and about 66° Bé.) is added by line L–o through meter N from sulfuric acid supply tank A. Reactor L is maintained at about 100° C. (212° F.) and has a retention time of two hours. The stripped sulfuric acid leaving reactor L contains about 2.7 pounds hydrogen fluoride and has been diluted with the water in the sulfuric acid to about 77.7% $H_2SO_4$. It leaves via line L–e in the quantity of about 5819 pounds to tank E. From tank E, it is utilized in the acidulation of phosphate rock to produce wet process phosphoric acid. The substantially dry hydrogen fluoride (about 106 pounds) contains as impurities about 1 pound of $SiF_4$ and about 1 pound of water. This hydrogen fluoride leaves reactor L via line L–p to a hydrogen fluoride condenser M. Anhydrous hydrogen fluoride in the amount of about 100 pounds leaves via line L–l to storage or utilization.

In condenser M substantially all of the water carried over as an impurity from reactor L is condensed as aqueous hydrofluoric acid (about 5 pounds of 80° HF) and is recycled via line L–k to the aqueous fluosilicic acid supply tank C. The silicon tetrafluoride released from reactor L is not condensed with the anhydrous HF and is returned to the absorber G via line L–r (about 1 pound of HF and about 1 pound of $SiF_4$).

Example II

Commercially concentrated (about 66° Bé.) sulfuric acid ($H_2SO_4$) is provided by tank A and 25% filtered fluosilicic acid ($H_2SiF_6$) by tank C. From tank A via line L–y to heater T flows about 4540 pounds of sulfuric acid. In heater T the acid is heated to about 125° C. (257° F.). After heating, the hot acid flows through line L–a to meter I which controls the amount going to reactor D to about 3189 pounds. The fluosilicic acid containing about 4 pounds of HF is also fed to reactor D and flows from tank C through line L–c and meter J controlling the amount to about 1625 pounds.

In reactor D, filtered aqueous fluosilicic acid is dehydrated by concentrated sulfuric acid. The retention time is about four minutes, the temperature about 125° C. (257° F.), and the terminal concentration of the liquid leaving the reactor about 69.6% $H_2SO_4$. Under these circumstances, substantially all (about 291.5 pounds) of the silicon tetrafluoride and a small portion (about 10 pounds) of the hydrogen fluoride are liberated as gases while the major portion (about 106.5 pounds) of the hydrogen fluoride remains in the sulfuric acid. Silicon tetrafluoride gases leave reactor D via duct D–f to a silicon tetrafluoride absorber G. Fresh aqueous fluosilicic acid (10% $H_2SiF_6$) flows from tank B in the amount of about 1254 pounds through meter K via line L–b to absorber G. About 112 pounds of water are added to absorber G via line L–m. In the silicon tetrafluoride absorber, silicon tetrafluoride reacts with water to form fluosilicic acid and silica. The slurry of silica and fluosilicic acid flows via line L–g to filter H where silica is removed and washed with about 50 pounds of water supplied by line L–i. Fluosilicic acid (about 1620 pounds of 25% $H_2SiF_6$) flows via line L–h and is recycled in the process to tank C. Silica (about 50 pounds dry basis) containing about 5 pounds fluosilicic acid ($H_2SiF_6$) is removed via conveyor L–j for use or further processing.

The sulfuric acid stream flows from reactor D via line L–n to reactor L. Additional hot concentrated sulfuric acid (about 1351 pounds) is added by line L–o through meter N from sulfuric acid supply tank A. Reactor L is maintained at about 100° C. (212° F.) and the liquid down flow rate is about 19 gallons per hour per square foot. The stripped sulfuric acid leaving reactor L contains about one-half pound hydrogen fluoride and has been diluted with the water in the sulfuric acid to about 77.7% $H_2SO_4$. It leaves via line L–e in the amount of about 5755 pounds to tank E. From tank E, the diluted acid is reconcentrated for re-use in the process.

The substantially dry hydrogen fluoride (about 108 pounds) contains as impurities about 2 pounds of silicon tetrafluoride ($SiF_4$) and about 1 pound of water. This hydrogen fluoride (HF) leaves reactor L via line L–p to a hydrogen fluoride condenser M. Anhydrous hydrogen fluoride in the amount of 100 pounds leaves via line L–l to storage or utilization. In condenser M, substantially all of the water carried over as an impurity from reactor L is condensed as aqueous hydrofluoric acid (about 5 pounds of 80% HF) and is recycled via line L–k to the aqueous fluosilicic acid supply tank C. The silicon tetrafluoride released from reactor L is not condensed with the anhydrous HF and is returned to the absorber G via line L–r (about 2 pounds of HF and about 1 pound of $SiF_4$).

*Example III*

Commercially concentrated (about 66° Bé.) sulfuric acid is provided by tank A and 25% filtered fluosilicic acid ($H_2SiF_6 \cdot SiF_4$) by tank C. About 7791 pounds of sulfuric acid flows from tank A via line L–y to heater T. In heater T, the acid is heated to about 130° C. (266° F.). After heating, the hot acid flows through line L–a to meter I which controls the amount going to reactor D to about 5305 pounds. The fluosilicic acid containing about 4 pounds HF is also fed to reactor D and flows from tank C through line L–c and meter J controlling the amount to about 2783 pounds.

In reactor D, filtered, aqueous fluosilicic acid is dehydrated by concentrated sulfuric acid. The retention time is about three minutes, the temperature about 130° C. (266° F.), and the terminal concentration of the liquid leaving the reactor about 69.7% $H_2SO_4$. Under these conditions, substantially all (about 581 pounds) of the silicon tetrafluoride and a small portion (about 10 pounds) of the hydrogen fluoride are liberated as gases while the major portion (about 106 pounds) of the hydrogen fluoride remains in the sulfuric acid. Silicon tetrafluoride gases leave reactor D via duct D–f to a silicon tetrafluoride absorber G.

Fresh aqueous fluosilicic acid (8% $H_2SiF_6 \cdot SiF_4$) flows from tank B in the amount of about 1655 pounds through meter K via line L–b to absorber G and about 590 pounds of water are added to absorber G via line L–m. In the absorber, silicon tetrafluoride reacts with water to form fluosilicic acid and silica. The slurry of silica and fluosilicic acid flows via line L–g to filter H where silica is removed and washed with about 60 pounds of water supplied by line L–i. Fluosilicic acid (about 2778 pounds of 25% $H_2SiF_6$) flows via line L–h and is recycled in the process to tank C. Silica (about 60 pounds on a dry basis) containing about 6 pounds of $H_2SiF_6 \cdot SiF_4$ is removed via conveyor L–j for use or further processing.

The sulfuric acid stream flows from reactor D via line L–n to reactor L. Additional hot concentrated sulfuric acid (about 2486 pounds) is added by line L–o through meter N from sulfuric acid supply tank A. Reactor L is maintained at about 100° C. (212° F.) and down flow rate is about 19 gallons per square foot per hour. The stripped sulfuric acid leaving reactor L contains about 1 pound hydrogen fluoride and has been diluted with the water in the sulfuric acid to about 77.7% $H_2SO_4$. It leaves via line L–e in the amount of about 9876 pounds to tank E. From tank E, it is utilized in the production of superphosphate.

The substantially dry hydrogen fluoride (about 107 pounds) contains as impurities about 1 pound of $SiF_4$ and about 1 pound of water. This hydrogen fluoride (HF) leaves reactor L via line L–p and goes to a hydrogen fluoride condenser M. Anhydrous hydrogen fluoride in the amount of about 100 pounds leaves via line L–l to storage or utilization.

In condenser M, substantially all of the water carried over as an impurity from reactor L is condensed as aqueous hydrofluoric acid (about 5 pounds of 80% HF) and is recycled via line L–k to the aqueous fluosilicic acid supply tank C. The silicon tetrafluoride released from reactor L is not condensed with the anhydrous HF and is returned to the absorber G via line L–r (about 1 pound of HF and about 1 pound of $SiF_4$).

The present invention is particularly applicable to situations such as the following:

In the manufacture of superphosphate, the phosphate rock normally employed contains from about three to about four percent fluorine. In the operation, about 25 to about 40% of the fluorine is evolved and must be scrubbed from the vapors leaving the den. When absorbed in water, a dilute fluosilicic acid results, which frequently presents a disposal problem. Sulfuric acid as produced by the contact process is more concentrated than is optimum for the production of superphosphate. The discovery disclosed herein affords a method of converting the otherwise undesirable waste fluosilicic acid into a valuable product, anhydrous hydrogen fluoride, at the same time converting the sulfuric acid to be used to a more desirable strength.

The same situation is true in the production of "wet process" phosphoric acid in which about 20% to about 50% of the fluorine values in the rock are liberated and must be recovered.

From the tremendous tonnage of phosphatic fertilizers consumed each year, the great value of this discovery is apparent.

In still another section of the art, this discovery has great value. The resources of high grade fluospar used in the production of hydrogen fluoride by conventional processes are somewhat limited. This process permits the utilization of low grade (high silica) fluospar ($CaF_2$). The fluospar is acidulated with the used acid from the process and the fluoride containing vapors absorbed in water to produce a mixture of hydrofluoric and fluosilicic acids. The mixture can then be converted by the present process to pure anhydrous hydrogen fluoride.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. In a process of producing hydrogen fluoride as a dry vapor from fluosilicic acid-containing solution in a two-stage procedure, the improvement which comprises subjecting a fluosilicic acid-containing solution to the action of heated concentrated sulfuric acid in a closed reactor in a first stage under conditions of relatively high concentration of sulfuric acid, relatively elevated temperature and relatively short retention time so that substantially all of the silicon tetrafluoride is evolved in the first stage as a substantially dry vapor while most of the vapor of hydrogen fluoride is retained in the remaining diluted weaker sulfuric acid solution, withdrawing said vapor containing silicon tetrafluoride from said closed reactor in said first stage, removing said diluted weaker sulfuric acid solution containing hydrogen fluoride vapor from said closed reactor in the first stage, conducting said removed solution to a larger closed reactor in a second stage, introducing into said larger closed reactor hot concentrated sulfuric acid sufficient to maintain a terminal concentration of sulfuric acid effective to cause the liberation of hydrogen fluoride as a substantially dry vapor, controlling the time of retention of said solution in said larger reactor in said second stage to an extended period to liberate substantially all of the hydrogen fluoride vapor from said solution, and withdrawing said liberated hydrogen fluoride vapor from said larger reactor in said second stage.

2. The improved process set forth in claim 1 in which the evolved silicon tetrafluoride is absorbed in an aqueous solution thereby effecting a reaction with water to form fluosilicic acid and precipitated hydrated silica, and the hydrated silica is removed from said solution to provide clear fluosilicic acid substantially devoid of free silica which can then be recycled to the first operation for treatment with hot sulfuric acid in the closed reactor in the first stage of the improved process.

3. The improved process set forth in claim 1 in which the evolved silicon tetrafluoride contains some hydrogen fluoride vapor and the latter vapor is separated thereby freeing silicon tetrafluoride vapor for conversion into fluosilicic acid containing solution for use in the first operation of the improved process.

4. The improved process set forth in claim 1 in which the temperature of the solution in the larger closed reactor in the second stage is controlled between about 200° F. and about 400° F. to cause rapid evolution of the hydrogen fluoride vapor.

5. The improved process set forth in claim 1 in which hot concentrated sulfuric acid is introduced as a stream into said solution in the closed reactor of the first stage to evolve vapor containing silicon tetrafluoride.

6. The improved process set forth in claim 1 which is used for manufacturing hydrofluoric acid and which involves the use of strong contact process sulfuric acid to dehydrate aqueous fluosilicic acid and to decompose the fluosilicic acid into its dry component vapors in the two-stage procedure while at the same time obtaining satisfactory dilution of the remaining sulfuric acid for use in the acidulation processes for the production of chemical products consisting of phosphoric acid and superphosphate.

7. The improved process set forth in claim 1 which is used for the manufacture of concentrated hydrofluoric acid and anhydrous hydrofluoric acid from fluosilicic acid and from a mixture of fluosilicic acid and hydrofluoric acid with the production of hydrated silica as a by-product in the two-stage procedure.

8. The improved process set forth in claim 1 in which the vapor containing silicon tetrafluoride is passed into an absorber containing an aqueous solution with sufficient water to convert said silicon tetrafluoride into fluosilicic acid and a precipitate of hydrated silica and the hydrated silica is removed as a by-product thereby providing a clear solution of fluosilicic acid which can be recycled to the first operation in the first stage whereby substantially all of the fluorine in the fluosilicic acid is converted to hydrogen fluoride while producing hydrated silica as a by-product.

9. The improved process set forth in claim 1 in which the surface-to-volume ratio between the surface of the reactor in the second stage and the volume of said solution is adjusted to be effective to cause the rapid evolution of the vapor containing hydrogen fluoride.

References Cited by the Examiner
UNITED STATES PATENTS
| | | | |
|---|---|---|---|
| 1,297,464 | 3/1919 | Hechenbleikner | 23—153 |
| 1,938,533 | 12/1933 | Penfield | 23—153 |
| 2,833,628 | 5/1958 | Molstad | 23—205 |

FOREIGN PATENTS
| | | |
|---|---|---|
| 614,239 | 2/1961 | Canada. |

MAURICE A. BRINDISI, *Primary Examiner.*

UNITED STATES PATENT OFFICE
CERTIFICATE OF CORRECTION

Patent No. 3,218,125                                November 16, 1965

Theodore T. Houston et al.

It is hereby certified that error appears in the above numbered patent requiring correction and that the said Letters Patent should read as corrected below.

Column 3, line 45, for "sulfur" read -- sulfuric --; column 5, line 5, after "is" insert -- also --; line 17, for "absorbed" read -- absorber --.

Signed and sealed this 20th day of September 1966.

(SEAL)
Attest:

ERNEST W. SWIDER                                      EDWARD J. BRENNER
Attesting Officer                                           Commissioner of Patents